United States Patent [19]

Sasaki et al.

[11] Patent Number: 5,096,968

[45] Date of Patent: * Mar. 17, 1992

[54] METHACRYLIMIDE-CONTAINING POLYMER AND RESIN COMPOSITION CONTAINING SAID POLYMER

[75] Inventors: Isao Sasaki, Otake; Kozi Nishida, Toyama; Hisao Anzai; Masaharu Fujimoto, both of Otake, all of Japan

[73] Assignee: Mitsubishi Rayon Company, Ltd., Tokyo, Japan

[ * ] Notice: The portion of the term of this patent subsequent to Sep. 4, 2007 has been disclaimed.

[21] Appl. No.: 458,497

[22] Filed: Dec. 28, 1989

[30] Foreign Application Priority Data

Dec. 29, 1988 [JP] Japan ............................... 63-334721
Dec. 29, 1988 [JP] Japan ............................... 63-334724

[51] Int. Cl.$^5$ ................................................ C08F 8/32
[52] U.S. Cl. ..................................... 525/142; 525/143; 525/169; 525/170; 525/175; 525/176; 525/182; 525/183; 525/205; 525/221; 525/228; 525/327.6; 525/329.6; 525/330.5; 525/378; 525/379
[58] Field of Search ............... 525/329.6, 327.6, 330.5, 525/142, 143, 169, 170, 175, 176, 182, 183, 205, 221, 228

[56] References Cited

U.S. PATENT DOCUMENTS

| | | |
|---|---|---|
| 2,146,209 | 2/1939 | Graves . |
| 4,246,374 | 1/1981 | Kopchik ............... 525/378 |
| 4,588,786 | 5/1986 | Kadono et al. ............ 525/329.6 |
| 4,820,778 | 4/1989 | Ohtani et al. ............ 525/329.9 |
| 4,954,575 | 9/1990 | Sasaki et al. ............ 525/378 |

FOREIGN PATENT DOCUMENTS

| | | |
|---|---|---|
| 0200530 | 5/1986 | European Pat. Off. . |
| 0216505 | 1/1987 | European Pat. Off. . |
| 0234726 | 2/1987 | European Pat. Off. . |

Primary Examiner—Bernard Lipman
Attorney, Agent, or Firm—Oblon, Spivak, McClelland, Maier & Neustadt

[57] ABSTRACT

A thermoplastic methacrylimide-containing polymer comprising 2 to 100% by weight of structural units represented by the following formula (I):

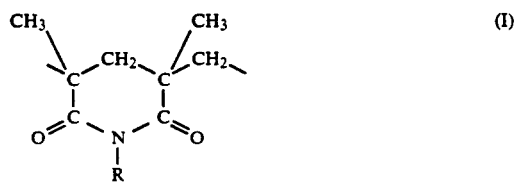

wherein R is hydrogen or a hydrocarbon group having 1 to 20 carbon atoms, and 0 to 98% by weight of structural units derived from an ethylenically unsaturated monomer, wherein the content of iron in the polymer is not larger than 20 ppm and the difference between the maximum value and minimum value of the degree of imidization is preferably not larger than 5% by weight. This methacrylimide-containing polymer is used alone or as a blend thereof with another thermoplastic polymer.

11 Claims, No Drawings

METHACRYLIMIDE-CONTAINING POLYMER AND RESIN COMPOSITION CONTAINING SAID POLYMER

BACKGROUND OF THE INVENTION

1. Field of the Invention

The present invention relates to a methacrylimide-containing polymer having an excellent heat resistance, transparency, and resistance to discoloration under heating with a lapse of time, and to a resin composition comprising this methacrylimide-containing polymer and having an excellent resistance to discoloration under heating with a lapse of time.

2. Description of the Related Art

A methyl methacrylate polymer has not only an excellent transparency but also excellent mechanical properties and weatherability, and therefore, this polymer has been used as a high-performance plastic optical material or decorative material. Recently, the development of uses of this polymer in the fields of short-distance communication and optical sensors has been investigated.

Nevertheless, since the heat distortion temperature of the methyl methacrylate polymer is about 100° C. and the heat resistance is too low, use of this polymer is considerably restricted in some fields where a heat resistance is required, and therefore, there is an urgent need for an improvement of the heat resistance of this polymer.

Imidization of a methyl methacrylate polymer is known as the means for improving the heat resistance of the methyl methacrylate polymer. For example, there have been proposed (1) a process in which a polymer of acrylic acid, methacrylic acid or an ester thereof is reacted under heating with a primary amine, ammonia or a compound capable of generating a primary amine or ammonia in the presence of a solvent (U.S. Pat. No. 2,146,209, German Patent No. 1,077,872 and German Patent No. 1,242,369), (2) a process in which a methyl methacrylate polymer is reacted with a primary amine in the presence of water (U.S. Pat. No. 3,284,425), and (3) a process in which an acrylic polymer is reacted with ammonia or a primary amine in an extruder (U.S. Pat. No. 4,246,374).

In the process (1), since the boiling point of the used solvent is high, it is difficult to completely separate the solvent from the imidized polymer on a commercial scale, and therefore, the obtained imidized polymer is colored and the transparency of the formed polymer is poor. In the process (2), since the reaction is carried out in the presence of water, when a partially imidized polymer is required, hydrolysis of the methyl methacrylate segments occurs, and therefore, it is difficult to obtain an imidized polymer having a desired heat resistance, and to obtain a uniform imidization. Furthermore, in the process (3), since the imidization reaction occurs between a polymer having a high viscosity and a gaseous imidizing substance, it is difficult to obtain a uniform imidization reaction, and therefore, it is difficult to obtain a uniformly partially imidized polymer.

Accordingly, the imidized polymers obtained according to the above-mentioned processes have an improved heat resistance, but if it is intended to prepare the polymers on a commercial scale, the transparency is poor or the imidization reaction becomes uneven, and therefore, these processes are not practically usable.

Japanese Unexamined Patent Publication No. 60-210606 discloses a process for the preparation of polymethacrylamide having an excellent transparency, in which an incorporation of iron from an extruder is prevented by reprecipitating a reaction product, by using a solvent and filtering and drying the reaction product. This process is complicated, however, and thus is not suitable for commercial working. Moreover, since the polymer obtained by reprecipitation is powdery, an extreme yellowing of the polymer occurs at the heat molding step.

Japanese Unexamined Patent Publication No. 62-187705 discloses a process wherein production of polymethylmethacrylate and imidization thereof are continuously carried out. The polymethyl methacrylimide obtained by this process and that obtained by the process of the above-mentioned Japanese Unexamined Patent Publication No. 60-210606 have a total luminous transmittance of 93 to 94%, but control of the imidization ratio is difficult in these processes, and although polyacrylamide having a narrow imidization ratio distribution can be obtained if sampling is carried out for a short time, the imidization ratio often changes if the operation is continuously carried out for from several hours to scores of hours. Therefore, if products prepared by continuously carrying out the operation for a long time are mixed and used, the transparency is poor because of a broad imidization ratio distribution.

Furthermore, a resin composition formed by mixing and blending the above-mentioned methacrylimide-containing polymer with another thermoplastic polymer has a problem in that an extreme yellowing of the molded article occurs and this yellowing is increased due to a deterioration caused by heating with a lapse of time, with the result that the commercial value is drastically reduced.

SUMMARY OF THE INVENTION

An object of the present invention is to overcome the above-mentioned defects of the conventional techniques and provide a methacrylimide-containing polymer having an excellent transparency and heat resistance while retaining the characteristic properties inherent to a methacrylic acid ester polymer, such as excellent optical characteristics, mechanical characteristics, weatherability, and molding processability.

Another object of the present invention is to provide a methacrylimide-containing polymer resin composition in which little yellowing occurs, which comprises this methacrylimide-containing polymer and another thermoplastic polymer.

In one aspect of the present invention, there is provided a methacrylimide-containing polymer, which is a thermoplastic polymer comprising 2 to 100% by weight of structural units represented by the following formula (I):

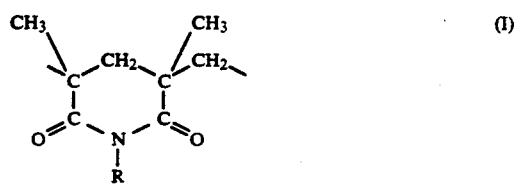

wherein R represents a hydrogen atom or an aliphatic, aromatic or alicyclic hydrocarbon group having 1 to 20 carbon atoms, and 0 to 98% by weight of structural units derived from an ethylenically unsaturated monomer, wherein the content of iron in the polymer is not larger than 20 ppm.

In another aspect of the present invention, there is provided a resin composition comprising 1 to 99% by weight of the above-mentioned methacrylimide-containing polymer in which the imidization degree distribution is not larger than 5% by weight and 99 to 1% by weight of other thermoplastic polymer, for example, a thermoplastic polymer selected from the group consisting of a copolymer (ABS resin) composed of acrylonitrile, butadiene and styrene, a copolymer (MBS resin) composed of methyl methacrylate, butadiene and styrene, a methacrylic resin polymer composed mainly of methyl methacrylate, a thermoplastic polyester, a modified polyolefin, an unmodified polyolefin, a polyamide, a polyphenylene oxide, and a polycarbonate.

DESCRIPTION OF THE PREFERRED EMBODIMENTS

The methacrylimide-containing polymer having an iron content not larger than 20 ppm and an imidization degree distribution of preferably not larger than 5% by weight according to the present invention is prepared by a process comprising, mixing a methacrylic acid ester polymer substantially uniformly with at least one compound represented by the following formula (II) (hereinafter referred to as "imidizing substance"):

$$R\text{-}NH_2 \qquad (II)$$

wherein R represents a hydrogen atom or an aliphatic, aromatic alicyclic hydrocarbon group having 1 to 20 carbon atoms, by a specific method, carrying out an imidization reaction in a specific solvent, removing volatile from the reaction liquid, and extrusion-components shaping the residual solid under specific conditions.

More specifically, methacrylimide-containing polymer of the present invention can be industrially advantageously continuously prepared by the following process.

In the continuous preparation of the methacrylimide-containing polymer, a solution comprising 10 to 60% by weight of an inert solvent, 90 to 40% by weight of a methacrylic acid ester or a mixture of methacrylic acid ester and an ethylenically unsaturated monomer copolymerizable therewith, 0.0001 to 0.5% by weight of a radical initiator and 0 to 5% by weight of a molecular weight modifier is continuously introduced into a first reaction zone where the solution is substantially uniformly mixed, at least 80% by weight of the initial monomer is converted to a polymer at a temperature of 80° to 170° C. in a second reaction zone where the reaction flows in the form of a plug flow, the reaction liquid and an imidizing substance represented by the formula (II) are subjected to an imidization reaction at a temperature of 150° to 350° C. in a third multi-staged reaction zone including at least two reaction zones, the reaction liquid finally heated at 150° to 350° C. is introduced into a final zone wherein the pressure is maintained below atmospheric pressure, the volatile components are separated and removed by flash distillation, and the polymer obtained by the flash distillation is continuously received by a specific screw and is shaped by a specific extruder.

The polymer of the present invention, the resin composition containing the polymer and the preparation process thereof will now be described in detail.

The methacrylimide-containing polymer of the present invention is an imidization product of a polymer of a methacrylic acid ester. The methacrylic acid ester to be imidized is a homopolymer of a methacrylic acid ester or a copolymer of a methacrylic acid ester with a copolymerizable ethylenically unsaturated monomer. Preferably, the methacrylic acid ester has an intrinsic viscosity of 0.01 to 3.0. The methacrylimide-containing polymer preferably has a molecular weight (Mw) as measured by gel permeation chromatography (GPC) of 50,000 to 200,000.

As the methacrylic acid ester constituting the homopolymer and copolymer, there can be mentioned, for example, methyl methacrylate, ethyl methacrylate, propyl methacrylate, n-butyl methacrylate, isobutyl methacrylate, tert.-butyl methacrylate, cyclohexyl methacrylate, norbonyl methacrylate, 2-ethylcyclohexyl methacrylate, and benzyl methacrylate. As the acrylic acid ester, there can be used methyl acrylate, ethyl acrylate, propyl acrylate, n-butyl acrylate, isobutyl acrylate, tert.-butyl acrylate, cyclohexyl acrylate, norbonyl acrylate, 2-ethylhexyl acrylate, and benzyl acrylate. As the copolymerizable ethylenically unsaturated monomer, there can be used methacrylic acid esters other than the used methacrylic acid ester, acrylic acid esters, acrylic acid, methacrylic acid, styrene and substituted styrenes such as 2-methyl-styrene. These monomers can be used alone or in the form of a mixture of two or more thereof.

Of these methacrylic acid ester polymers, a methyl methacrylate homopolymer or a copolymer of at least 25% by weight of methyl methacrylate with up to 75% by weight of a copolymerizable ethylenically unsaturated monomer is preferably used. From the viewpoint of the transparency, a homopolymer of methyl methacrylate is most preferably used.

The polymerization reaction and imidization reaction are carried out in the presence of a solvent. The inert solvent used must not inhibit the advance of the polymerization reaction or imidization reaction and must not substantially react with the reaction mixture. For the partial imidization reaction, the solvent must not cause any substantial change of segments of the methyl methacrylate. Furthermore, the solvent must be easily separated and removed from the formed imidized polymer.

A mixed solvent of a poor solvent having a boiling point of 50° to 150° C. under atmospheric pressure, which cannot substantially dissolve the methacrylic resin at normal temperature, and a good solvent capable of easily dissolving the methacrylic resin, are preferably used as the solvent. Especially preferably, a solvent having a solubility parameter $\delta$ of 14.0 to 19.5 $(cal/cm^3)^{\frac{1}{2}}$ is used as the poor solvent and a solvent having a solubility $\delta$ of 8.0 to 13.9 $(cal/cm^3)^{\frac{1}{2}}$ is used as the good solvent. As an example of the poor solvent, methanol can be mentioned. As examples of the good solvent, there can be mentioned alcohols such as pentanol, hexanol, 2-methylpentanol, 4-methyl-2-pentanol, 2-ethyl-1-butanol, 1-pentanol and octanol; aromatic hydrocarbon compounds such as benzene, toluene, xylene, ethylbenzene, cumene, mesitylene, naphthalene, tetralin, butylbenzene, diethylbenzene, pentylbenzene and biphenyl; and ketone and ether compounds such as phorone, isophorone, cyclohexanone, acetophenone, dibutyl ether, dihexyl ether, anisole, phenetole, dibutyl phenyl ether, diphenyl ether, diglyme and diethylene glycol diethyl ether. Of these good solvents, toluene, benzene, xylene, and ethylbenzene are preferably used.

The solubility parameter δ referred to in the present invention is based on the standard described in the Polymer Handbook, Second Edition, J. Brandrup, E. H. Immergut, John Wiley & Sons, New York).

In the mixed solvent used in the preferable preparation process, if the boiling points of the poor solvent and good solvent are higher than 150° C. under atmospheric pressure, it is difficult to sufficiently remove the volatile substance composed mainly of the solvents from the reaction product obtained by the imidization reaction. If the boiling points are lower than 50° C., it is impossible to elevate the imidization reaction temperature because the inner pressure of the reaction system is increased by an elevation of the temperature, and therefore, the imidization reaction cannot be satisfactorily performed. Furthermore, when volatile substances are separated and removed from the reaction product, an abrupt evaporation occurs and a control of the separating operation is difficult. If the solubility parameters δ of the combined poor and good solvents are outside the above-mentioned ranges, it is difficult to obtain a uniform polymerization reaction and imidization reaction, and it is difficult to obtain a methacrylimide-containing polymer having a high quality.

The solvent is used in an amount of 10 to 60% by weight based on the sum of the solvent and monomer. If the amount of the solvent is smaller than 10% by weight, the viscosity of the reaction mixture is too high, and the handling becomes difficult, and since the polymerization reaction or imidization reaction does not progress uniformly, the quality of the obtained polymer is poor. If the amount used of the solvent is larger than 60% by weight, separation of the solvent from the polymer becomes difficult and the amount of polymer obtained is small, and thus the process is industrially disadvantageous. Preferably, the solvent is used in an amount of 20 to 50% by weight.

When the mixed solvent is used, the poor solvent/good solvent weight ratio is from 99/1 to 1/99, preferably, from 90/10 to 10/90.

The inert solvent used diffuses the imidizing substance easily in the methacrylic polymer and causes the imidization reaction to progress uniformly and prominently while effectively controlling and removing heat generated by the reaction, and therefore, a transparent methacrylimide-containing polymer having an excellent heat resistance, which is a desirable optical material, can be obtained.

The radical polymerization initiator used at the polymerization is actively decomposed at the reaction temperature to generate a radical. For example, there can be mentioned organic peroxides such as di-tert.-butyl peroxide, dicumyl peroxide, methyl ethyl ketone peroxide, di-tert.-butyl perphthalate, di-tert.-butyl perbenzoate, tert.-butyl peracetate, 2,5-dimethyl-2,5-di(tert.-butylperoxy)hexane, di-tert.-amyl peroxide, 2,5-dimethyl-2,5-di(tert-butylperoxy)hexane, benzoyl peroxide and lauryl peroxide, and azo compounds such as azobisisobutanol diacetate, 1,1-azobiscyclohexanecarbonitrile, 2-phenylazo-2,4-dimethyl-4-methoxyvaleronitrile, 2-cyano-2-propylazoformamide, and 2,2'-azobisisobutyronitril. These radical polymerization initiators can be used alone or in the form of a mixture of two or more thereof. The amount used of the radical polymerization initiator is within the range of 0.0001 to 0.5% by weight based on the solution containing the monomer.

Mercaptans and the like customarily used can be used as the molecular weight modifier. As specific examples of the mercaptan, there can be mentioned primary, secondary and tertiary mercaptans having an alkyl group or a substituted alkyl group, such as n-butylmercaptan, isobutylmercaptan, n-octylmercaptan, n-dodecylmercaptan, sec.-butylmercaptan, sec.-dodecylmercaptan, and tert.-butylmercaptan, aromatic mercaptans such as phenylmercaptan, thiocresol, and 4-tert.-butyl-o-thiocresol, thioglycolic acid and esters thereof, and mercaptans having 3 to 18 carbon atoms, such as ethylene glycol mercaptan. As the non-mercaptan molecular weight modifier, there can be used at least one member selected from the group consisting of α-terpinolene, terpinol, and alkyl-substituted-1,4-cyclohexadienes. As the alkyl-substitutedcyclohexadiene, there can be mentioned 7-terpinene, 2-methyl-1,4-cyclohexadiene, 2,6-dimethylcyclohexadiene, 2,5-dimethylcyclohexadiene, 2-isopropyl-1,4-cyclohexadiene, and 2-ethyl-1,4-cyclohexadiene. Substantially, the amount of the molecular weight modifier used is up to 5% by weight.

In the preferable process for the continuous preparation of a methacrylic acid ester polymer, the above-mentioned monomer solution is introduced into a first reaction zone, in which the monomer solution is substantially homogeneously mixed, and at least 40% by weight of the monomer is converted to a polymer at a temperature of 60° to 190° C. If the polymerization temperature in the first reaction zone is lower than 60° C., the viscosity of the polymer becomes high and it is difficult to obtain a homogeneous mix. If the polymerization temperature is higher than 190° C., the formation of reaction by-products becomes conspicuous. Accordingly, the polymerization temperature in the first reaction zone is 60° to 190° C., preferably 70° to 180° C.

It has been found that, if the conversion of the monomer to the polymer in the first reaction zone is lower than 40% by weight, the thermal decomposition resistance of the finally obtained methacrylimide-containing polymer is low. The cause of this phenomenon has not been elucidated, but it is assumed that this phenomenon is probably due to the change of the terminal structure of the polymer molecule, which has a relation to the reaction mechanism for stopping the polymerization. If the thermal decomposition resistance of the polymer is reduced, a defect called "silver streak" appears due to the decomposition product, during the molding processing, and the appearance and physical properties are poor. Accordingly, the conversion of the monomer to the polymer in the first reaction zone is at least 40% by weight, preferably at least 60% by weight. If a substantially homogeneous mix is not obtained in the first reaction zone, and a portion having a polymerization conversion lower than 40% by weight is partially present, a polymer having a poor thermal decomposition resistance is partially formed. Accordingly, in the first reaction zone, a substantially homogeneous state must be maintained by a thorough mixing. This thorough mixing in the first reaction zone usually can be obtained by a stirring mixing tank provided with an anchor, helical ribbon, screw or paddle type stirrer.

In the second reaction zone having a plug flow, the polymerization liquid from the first reaction zone is polymerized at a temperature of 80° to 170° C. to convert at least 80% by weight of the initial monomer to a polymer.

The imidizing substance of formula (II) used in the third reaction zone reacts partially with the monomer if any monomer remains, whereby an amide derivative as a high-boiling-point by-product is formed. If a large quantity of unconverted monomer remaining in the second reaction zone is introduced into the third reaction zone, the formation of the amide derivative as the high-boiling-point by-product becomes conspicuous, and separation of this by-product from the polymer becomes difficult. If the amide derivative as the high-boiling-point by-product remains in the polymer, discoloration or a lowering of the quality of the polymer occurs. Accordingly, to control the formation of the amide derivative as the high-boiling-point by-product in the third reaction zone, the polymerization conversion of the initial monomer in the third reaction zone must be at least 80% by weight, preferably at least 90% by weight.

To attain a high polymerization conversion in the second reaction zone, a reaction apparatus having a plug flow must be provided, that is, a reaction apparatus having a relatively long shape, which is constructed so that the reaction mixture is supplied from one end and discharged from the other end, and mingling in the longitudinal direction of the reaction apparatus does not substantially occur. For example, there can be mentioned a screw extruder type reaction apparatus disclosed in U.S. Pat. No. 3,234,303, a columnar reaction apparatus disclosed in U.S. Pat. No. 3,252,950, a tubular reaction apparatus provided with a baffle plate, disclosed in British Patent No. 2,101,139, and a hollow tubular reaction apparatus.

The polymerization temperature in the second reaction zone is not higher than 170° C. For the above-mentioned reason, the polymerization conversion in the second reaction zone is adjusted to at least 80%. Nevertheless, the highest obtainable polymerization ratio is influenced by the equilibrium between the growth reaction of the active polymer and the reverse growth reaction at a given temperature, that is, by the polymerization temperature, and if the polymerization temperature is higher than 170° C., it is difficult to obtain a polymerization ratio of 80%. On the other hand, if the polymerization temperature is lower than 80° C., the rate of polymerization is reduced and the process becomes economically disadvantageous. Furthermore, the viscosity is increased, and thus delivery of the reaction liquid becomes difficult. Accordingly, the reaction temperature in the second reaction zone is 80 to 170° C., preferably 90° to 160° C.

An imidizing substance of the formula (II) is added to the polymerization reaction liquid from the second reaction zone, and the reaction liquid is introduced into the third reaction zone. The imidizing substance can be used alone or when dissolved and diluted in an inert solvent as mentioned above.

In the present invention, preferably the starting material (methacrylic resin) is substantially uniformly mixed with the imidizing agent represented by the formula (II), before the imidization reaction. If the imidization reaction is advanced and the starting methacrylic resin is not uniformly mixed with the imidizing agent, a heterogeneous methacrylimide-containing polymer is formed and the imidization ratio distribution becomes substantially large, with the result that the transparency of the molded article is poor and the commercial value including the quality is lowered. Moreover, when the obtained polymer is blended with another thermoplastic polymer, homogeneous mixing becomes difficult and a lowering of the physical properties of the resulting polymer composition cannot be avoided.

The present inventors carried out an investigation with a view to solving these problems, and as a result found that, if the starting methacrylic resin and imidizing substance are uniformly dissolved in the above-mentioned specific solvent for the imidization reaction, without an advance of the imidization reaction, a homogeneous methacrylimide-containing polymer can be prepared industrially advantageously prepared.

To obtain this dissolution, the stirring must be carried out for at least 1 minute at a dissolution temperature of 50° to 190° C. If the temperature is higher than 190° C., the imidization reaction is advanced during the mixing and an uneven imidization reaction occurs, and the obtained methacrylimide-containing polymer has a very broad imidization ratio distribution. On the other hand, if the temperature is lower than 50° C., a long time is required for the mixing and dissolution and the process becomes industrially disadvantageous. At least 1 minute is necessary for the mixing and dissolution. Stirring is necessary for the mixing, and for a continuous production, preferably the starting material and imidizing substance are mixed while passing them through a line provided with an in-line mixer or static mixer. If the mixing in this zone is insufficient, the imidization ratio distribution of the obtained methacrylimide-containing polymer is broad, and the product is a mixture of methacrylimide-containing polymers having different degrees of imidization, with the result that the transparency of the product is poor and the industrial value is drastically reduced. Preferably, the imidization degree distribution of the polymer is not larger than 5% by weight, especially not larger than 2% by weight. If the solubility parameters δ of the poor and good solvents of the mixed solvent used in the preparation process are outside the above-mentioned ranges, it is difficult to obtain a uniform imidization reaction, and to obtain a methacrylimide-containing polymer having an excellent quality.

The reaction of the methacrylic polymer obtained in the second reaction zone with the imidizing substance is carried out in the third reaction zone after they have been thoroughly mixed as mentioned above. Preferably, the third reaction zone comprises at least two reaction zones. One reaction zone is a condensation reaction zone in which the methacrylic polymer is reacted with the imidizing substance to cause a condensation reaction among polymeric side chains of the methacrylic polymer, and the other reaction zone is an aging reaction zone in which the reaction product containing the imidized polymer is again heated to further promote the imidization reaction. The imidization of the methacrylic polymer is advanced by at least two steps in the condensation reaction zone and the aging reaction zone. If necessary, a plurality of condensation reaction zones and a plurality of aging reaction zones can be combined. The reaction between the methacrylic polymer and the imidizing substance in the reaction zone is carried out at a temperature of 150° to 350° C. If the reaction temperature is lower than 150° C., the rate of the imidization reaction is low, and if the reaction temperature is higher than 350° C., the decomposition of the starting methacrylic polymer occurs concurrently. The reaction time in the condensation reaction zone is not particularly critical, but a shorter reaction time is preferable from the viewpoint of the productivity, and thus the reaction time is 20 minutes to 5 hours. If the reaction is carried out in the continuous manner, the average residence time is about 20 minutes to about Preferably, the monomer solution and imidizing Substance solution are passed through filters before being introduced into the reaction apparatus, to remove fine foreign matter contained therein. The light-transmitting property and the like of the molded article are adversely influenced if large quantities of fine foreign matter are contained.

If water is present in the reaction system at the imidization reaction, undesirable hydrolysis of the ester portion of the methacrylic resin with water occurs as a side reaction during the imidization and condensation, with the result that methacrylic acid is formed in the obtained methacrylimide-containing polymer and it is difficult to obtain an intended methacrylimide polymer having a desired degree of imidization. Therefore, this reaction is carried out in the state in which the reaction does not substantially contain water, more specifically, at a water content not larger than 1% by weight, preferably under an anhydrous condition.

To prevent discoloration of the obtained imidized polymer, preferably, the reaction is carried out in an inert gas atmosphere containing nitrogen, helium or argon gas.

As specific examples of the imidizing substance represented by formula (II), there can be mentioned aliphatic primary amines such as methylamine, ethylamine, and propylamine, compounds capable of forming an aliphatic primary amine under heating, such as 1,3-dimethylurea, 1,3-diethylurea, and 1,3-dipropylurea, and ammonia and urea. There also can be mentioned aromatic amines such as aniline, toluidine, and trichloroaniline, and alicyclic amines such as cyclohexylamine and bornylamine.

In view of the heat resistance and transparency, methylamine, ammonia, and cyclohexylamine are preferably used as the imidizing substance.

The amount of the imidizing substance used is not simply defined but depends on the amount to be imidized. In general, however, the imidizing substance is used in an amount of 1 to 250 parts by weight per 100 parts by weight of the methacrylic ester polymer. If the amount of the imidizing agent is smaller than 1 part by weight, a substantial improvement of the heat resistance cannot be obtained, and if the amount of the imidizing substance is larger than 250 parts by weight, the process becomes economically disadvantageous.

The imidization reaction product withdrawn from the condensation reaction zone is supplied to the aging reaction zone, if necessary. In the aging reaction zone, the aging reaction is carried out at a temperature of 150° to 350° C., preferably 170° to 300° C., as in the case of the reaction at the preceding step.

To effectively carry out the aging reaction in the aging reaction zone, the aging reaction time should be at least 5 minutes, and if the aging reaction is carried out in the continuous manner, the average residence time should be at least 5 minutes. If the aging reaction time is shorter than 5 minutes, a substantial aging effect cannot be obtained. It is not clear what contribution is made to the product by the aging reaction per se, but if the aging reaction is not satisfactory, unreacted amide segments remain in the polymer product, and the heat resistance, the thermal decomposition resistance, and the yellowing after exposure to heat are poor.

Preferably, the amount of non-volatile amide segments in the polymer is not larger than 5% by weight based on the weight of the polymer.

From the viewpoint of the heat resistance, the degree of imidization of the methacrylic resin is preferably such that the amount of the structural units represented by formula (I) is 2 to 100% by weight, preferably 30 to 100% by weight, most preferably 50 to 100% by weight.

The methacrylimide-containing polymer obtained by the imidization has an intrinsic viscosity of 0.02 to 4.5 (the measurement method will be described hereinafter).

The reaction apparatus used for the practice of the present invention is not particularly critical, as long as the object of the present invention can be realized. For example, there can be mentioned a plug flow type reaction apparatus, a screw extruder type reaction apparatus, a columnar reaction apparatus, a tubular reaction apparatus, a duct-shaped reaction apparatus, and a tank type reaction apparatus. To obtain a uniform imidization reaction and a uniform methacrylimide-containing polymer, preferably a tank type reaction apparatus provided with a stirring device having an inlet and an outlet, in which the entire reaction vessel has a mixing function, is used.

After the termination of the imidization reaction, volatile components are separated from the reaction liquid to obtain an intended polymer. The volatile components can be efficiently separated by flashing the reaction product containing large quantities of the volatile components, while maintaining a stable flow state More specifically, the reaction mixture is heated at 180° to 300° C., more preferably 200° to 250° C., and flashed into a tank maintained at an atmospheric pressure or a reduced pressure preferably under 20 to 100 Torr, through a small orifice of a nozzle. The flashed polymer is received on an extruder screw and is recovered in the form of a strand from a die through the extruder.

The volatile components remaining in the product can be efficiently removed by carrying out a combination of a flashing into a reduced pressure atmosphere and a deaeration in the extruder. To prevent yellowing of a molded article of the obtained polymer, preferably the amount of the amide derivative as the volatile component in the polymer is not larger than 1000 ppm, and the amount of the residual monomer is not larger than 500 ppm.

When a screw type extruder is used, an incorporation of iron occurs due to contact friction between a rotation shaft and a barrel caused by a deflection of the rotation shaft or by a corrosion of the screw and barrel. As a result of research, it was found that this incorporation of iron tends to promote the discoloration under heating, and if the product is exposed to a high-temperature atmosphere for a long time, yellowing of the product occurs whereby, the appearance of the product becomes poor and the transparency is reduced.

This discoloration by exposure under heating is conspicuous if the iron content in the polymer is greater than 20 ppm. Accordingly, the iron content must be not larger than 20 ppm, particularly not larger than 10 ppm. To control the incorporation of iron to an iron content of not larger than 20 ppm, the screw of the extruder must have a chromium plating layer which is corrosion resistant, and a super-hard steel must be used for the screw proper to prevent a deflection of the rotation shaft. Moreover, the barrel must be made of a stainless steel having a corrosion resistance.

Additives such as an antioxidant, a plasticizer, a lubricant and an ultraviolet absorber can be added to the methacrylimide polymer of the present invention according to need.

The resin composition obtained by blending the methacrylimide-containing polymer with another thermoplastic polymer is generally superior to a methacrylimide-containing polymer in which the iron content and imidization ratio are not specified, in that the resistance to discoloration under heating is improved and a good gloss is obtained because of a good compatibility.

A resin composition having a good resistance to discoloration under heating and a good surface gloss can be obtained by blending the methacrylimide-containing polymer of the present invention with another thermoplastic polymer, for example, at least one member selected from the group consisting of an ABS resin (copolymer composed of acrylonitrile, butadiene and styrene), an MBS resin (copolymer composed of methyl methacrylate, butadiene and styrene), a methacrylic resin polymer composed mainly of methyl methacrylate, a thermoplastic polyester, a modified polyolefin, an unmodified polyolefin, a polyamide, a polyphenylene oxide, and a polycarbonate.

In general, the amount of methacrylimide-containing polymer prepared according to the present invention can be changed over a broad range of 1 to 99% by weight based on the total resin composition.

Still another thermoplastic polymer can be used in combination with the above-mentioned thermoplastic polymer according to need. As the thermoplastic polymer to be used in combination with the above-mentioned thermoplastic polymer, there can be mentioned vinyl type polymers such as polystyrene, a styrene/acrylonitrile copolymer, a styrene/methyl methacrylate/acrylonitrile copolymer, an α-methylstyrene/styrene/acrylonitrile copolymer, an α-methylstyrene/methyl methacrylateacrylonitrile copolymer, a styrene/N-phenylmaleimide copolymer, a p-methylstyrene/acrylonitrile copolymer, and a styrene/maleic anhydride copolymer, polyolefin rubbers such as polyethylene, polypropylene, an ethylene/butene-1 copolymer, an ethylene/propylenedicyclopentadiene copolymer, an ethylene/propylene-/1,4-hexadiene copolymer, an ethylene/vinyl acetate copolymer, and an ethylene/butyl acrylate copolymer, and thermoplastic elastomers such as a polyether ester, a polyether ester amide, and a polyether amide.

As apparent from the foregoing description, the methacrylimide-containing polymer of the present invention has a reduced content of iron and a yellowness index (YI) value (as measured by a color difference meter) preferably not larger than 3, and thus, has a good transparency, a high heat resistance, and an excellent resistance to discoloration under heating.

Accordingly, the methacrylimide-containing polymer of the present invention can be widely used in the fields where such characteristics are required, for example, for the production of optical fibers, optical disks, CRT filters, meters, display materials for digital display boards, illuminating optical articles, automobile head lamp light covers, lenses and electrical parts. Furthermore, blends of this polymer with other thermoplastic resins can be widely used as various molding materials.

The present invention will now be described in detail with reference to the following examples. In the examples, all of "parts" and "%" are by weight unless otherwise indicated.

In the examples, the characteristics of the polymers were determined by the following methods.

(1) IR Absorption Spectrum

The infrared absorption spectrum was measured by the KBr disk method using an infrared spectrophotometer (Model 285 supplied by Hitachi).

(2) Heat Distortion Temperature (HDT)

The heat distortion temperature was measured according to ASTM D-648.

(3) Total Luminous Transmittance

The total luminous transmittance (%) of the molded article was measured according to ASTM D-1003. An injection-molded board having a size of 40 mm×40 mm ×3 mm was used as the sample.

(4) Degree of Imidization

The nitrogen content in the polymer [N(%)] was determined by elementary analysis using a CHN coder (Model MT-3 supplied by Yanagimoto Seisakusho), and the degree of imidization was calculated from the determined nitrogen content. For example, the degree of imidization x was calculated as follows:

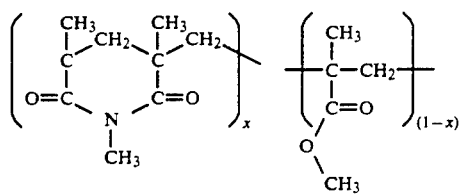

$$N(\%) = \frac{14x}{167x + (1-x)100} \times 100$$

(5) Imidization Degree Distribution

Pellets of the methacrylimide-containing polymer were used as the population, an optical samples were collected, and the degree of imidization was determined by the method described in (4) above. The imidization degree distribution was expressed in terms of the difference between the maximum and minimum imidization degree values.

(6) Yellowness Index

The yellowness index (YI value) was determined by using a color analyzer (Model 307 supplied Hitachi) of a color difference meter according to JIS K-7103. An injection-molded plate having a size of 40 mm×40 mm ×3 mm was used as the sample. Since the methacrylimide-containing polymer resin was a transparent material, the transmitted light was measured to determine the YI value. When a resin composition comprising the methacrylimide-containing polymer and other thermoplastic polymer was opaque, the reflected light was measured to determine the YI value.

The YI value was calculated from excitation values X, Y and Z according to the following equation:

YI value=100(1.28X−1.06Z)/Y

(7) YI change after Heating

Injection-molded plates (having a size of 40 mm × 40 mm × 3 mm) of the methacrylimide-containing polymer and the composition comprising this polymer and another resin polymer were exposed to air at 130° C. for 1000 hours, and the yellowness index change (ΔYI) after heating was calculated according to the following equation:

ΔYI = YI − Y10 wherein ΔYI represents the yellowness index change, YI represents the yellowness index after the exposure, and Y10 represents the yellowness index of the test sample or test piece.

(8) Iron Content in Polymer

The polymer (5 g) was weighed and burnt by a gas burner, the residue was dissolved in a 6N aqueous solution of hydrochloric acid, and the solution was diluted to a 0.1 N aqueous solution of hydrochloric acid. The measurement was carried out by using a high-frequency plasma emission spectroscopic analyzer (supplied by Nippon Jarrell Ash).

(9) Surface Gloss

The resin composition comprising the methacrylimide-containing polymer and another thermoplastic polymer was molded into a plate having a size of 40 mm × 40 mm × 3 mm, and the surface gloss was measured according to JIS Z-8741 by using a Murakami gloss meter. The initial surface gloss was measured just after the molding.

(10) Attenuation in Light Transmittance

The obtained pelletized polymer was melt-shaped into a strand having a diameter of 1 mm, and the strand was coated with an outer layer having a low refractive index, to obtain a light-transmitting member. The attenuation in light transmittance of the light-transmitting member was measured by the method disclosed in Japanese Unexamined Patent Publication No. 62-187705.

(11) Recovery of Pellets

In each of the examples and comparative examples, all of the pellets obtained by carrying out a continuous operation for 24 hours were mixed, the mixture was analyzed, and the properties thereof were evaluated.

(12) Fine Particle Content

The fine particle content was determined by weighing 5 g of the polymer, dissolving the polymer in 30 ml of dichloroethane, and measuring the number of particles having a size of 0.5 to 25 μm by a counter calibrated with respect to a scattering of laser beams by using HIAC-ROYCO.

(13) Intrinsic Viscosity

The flow time (ts) of a dimethylformamide solution containing 0.5% by weight of the sample polymer and the flow time (to) of dimethylformamide were measured at 25+0.1° C. by using a Deereax-Bischoff viscometer, and the relative viscosity ηrel of the polymer was determined from the value ts/to. Then the intrinsic viscosity was calculated from the following equation:

$$\text{Intrinsic viscosity} = \lim_{c \to 0} \ln(\eta rel)/c$$

wherein c represents the gram number of the polymer per 100 ml of the solvent.

(4) Molecular Weight

Molecular weight measurement by GPC

The molecular weight of polymer is measured in accordance with descriptions in "Gel Chromatography (basic edition)", pp. 97–122, publish from Kodansha. using Column HSG-20, 50 (manufactured by Shimazu Seisakusho, Co.). A calibration curve was prepared from a standard polystyrene (manufactured by Fresher Chemical Co.) and the specimen was leached out using tetrahydrofuran solution. The leaching curve obtained by using the specimen solution was equally divided and the height at each of the divisional points was measured to determine Mw by the following equation $$Mw = Qm \sum_i [Hi \times Mi(p)]/Qp \sum_i Hi$$

where
Hi: height of the leaching curve at the divisional point.
Mi(p): molecular weight of a standard polystyrene at divisional point i.
Qm, Qp: Q factor for the polymer and polystyrene, which are respectively assumed as 40 and 41.

EXAMPLE 1

A polymerization feed liquid comprising 65 parts of methyl methacrylate, 30 parts of toluene, 5 parts of methanol, 0.08 part of 1,1'-azobiscyclohexanecarbonitrile, 0.0325 part of 2,2-azobisisobutyronitrile and 0.3 part of N-octylmercaptan was continuously supplied at a rate of 4 l/hr into a first stirring tank type reaction apparatus having an inner volume of 20 liters. When the polymerization conversion was measured just after the reaction liquid left the reaction apparatus, it was found that the conversion was 65%.

The polymerization liquid was introduced into a multi-tubular second reaction apparatus of the heat exchange type (constructed by 30 straight tubes having an inner diameter of 12.7 mm and a length of 1,000 mm), and reaction was carried out at a temperature of 140° C. until the polymerization conversion was elevated to 95%. The polymerization liquid was mixed with an imidizing substance described below and was introduced into a stirring tank type reaction apparatus in the third reaction zone.

Separately, a mixed solvent (toluene/methanol weight ratio=1/1) for diluting the imidizing substance (methylamine) was prepared and methylamine was then added at a concentration of 40% by weight. Then, the liquid was fed at a rate of 1.2 l/hr, mixed with the above-mentioned polymerization liquid and supplied into the third reaction zone.

The polymerization liquid and the imidizing substance were thoroughly mixed together at 100° C. for a residence time of 5 minutes by an in-line mixer and the liquid mixture was supplied into the stirring tank type reaction apparatus of the third reaction zone having an inner volume of 15 l where the liquid mixture was maintained at a temperature of 230° C. to effect an imidization reaction. The reaction liquid from this reaction zone was supplied into a stirring tank type reaction apparatus having an inner volume of 3 liters where the reaction liquid was aged at 230° C.

The reaction liquid from these reaction zones was flashed into a tank maintained under a reduced pressure of 100 Torr, from a nozzle orifice. The flashed polymer was supplied onto a screw having an L/D ratio of 20 and extruded in the form of a strand from a double-vented twin-screw extruder having a diameter of 30 mm, whereby the polymer was pelletized. In the double-vented extruder, the vent portion was maintained at a pressure of 5 mmHg and a temperature of 260° C., the temperature of the metering portion was 270° C. and the temperature of the die portion was 255° C. The screws of the extruder were chromium-plated and the barrel thereof was made of stainless steel.

When the infrared absorption spectrum of the obtained pelletized polymer was measured, it was found that characteristic absorptions of methacrylimide were present at wave numbers of 1720 cm$^{-1}$, 1663 cm$^{-1}$ and 750 cm$^{-1}$, and it was confirmed that the obtained polymer was methacrylimide-containing polymer. The physical properties of the obtained polymer were as follows.
Total luminous transmittance: 93%
Heat distortion temperature: 145° C.
Degree of imidization: 80%
Imidization degree distribution: 1.5%
YI: 0.5
ΔYI: 0.9
Iron content in polymer: 0 8 ppm As apparent from the above data, a methacrylimide-containing polymer having an excellent transparency, heat resistance, resistance to discoloration under heating, and resistance to discoloration under heating with a lapse of time was obtained.

Comparative Example 1

The same monomer composition and imidizing substance as used in Example 1 were used, and the polymerization and imidization were carried out in the same manner as described in Example 1 except that the mixing of the polymerization liquid from the second reaction vessel with the imidizing substance was carried out without using the in-line mixer, and the barrel of the extruder used was made of a nitride steel and the screw thereof was not chromium-plated.

The physical properties of the obtained polymer were as shown below.
Total luminous transmittance: 86%
Heat distortion temperature: 145° C.
Degree of imidization: 80% (average value)
Imidization degree distribution: 7.5%
YI: 3.2
ΔY: 9.0
Iron content in polymer: 23.0 ppm As apparent from the data shown above, the obtained polymer had an inferior transparency to that of the polymer obtained in Example 1, and a lower resistance to discoloration under heating and resistance to change under heating with a lapse of time.

EXAMPLE 2

A monomer mixture comprising 100 parts of monomeric methyl methacrylate, 0.1 part of 1,1′-azobiscyclohexanecarbonitrile and 0.2 part of n-octylmercaptan was heated at 100° C. for 17 hours to obtain a starting material (methacrylic resin). The polymerization conversion was 99%. A 10-liter reaction vessel equipped with a paddle spiral stirrer, a pressure gauge, a sample injector, and a jacketed heater was charged with 100 parts of the methacrylic resin and 80 parts of toluene and 20 parts of methanol, and the inner atmosphere was replaced by nitrogen. Then the temperature was elevated to 150° C. with stirring to dissolve the methacrylic resin, a solution of 18.6 parts (molar ratio of 0.6) of methylamine in methanol was charged in the injector, and was added to the solution at 150° C., the mixture was stirred for 30 minutes, and the temperature of the charge in the reaction vessel was elevated to 230° C. The reaction was carried out under and inner pressure of 60 kg/cm$^2$·G for 3 hours. After termination of the reaction, the formed N-methylmethacrylimide-containing polymer was flashed into a tank maintained under a reduced pressure of 100 Torr, from a nozzle orifice, the flashed polymer was supplied onto a vented extruder screw having an L/D ratio of 20, and the polymer was shaped into a strand by the extruder. The screw of the extruder was chromiumplated and the barrel thereof was made of a stainless steel.

When the infrared absorption spectrum of the obtained polymer was measured, characteristic absorptions of the methacrylamide-containing polymer were observed at wave numbers of 1720 cm$^{-1}$, 1633 cm$^{-1}$ and 750 cm$^{-1}$. The pressure and temperature of the vented portion of the extruder were 5 mmHg and 260° C., respectively, the temperature of the metering zone was 270° C., and the temperature of the die was 255° C.

The physical properties of the obtained polymer were as follows.
Total luminous transmittance: 93%
Heat distortion temperature: 145° C.
Degree of imidization: 80%
Imidization degree distribution: 1.8%
YI: 1.5
ΔYI: 1.3
Iron content in polymer 1.0 ppm As apparent from the above data, the methacrylimide-containing polymer had an excellent transparency, heat resistance, resistance to discoloration under heating, and resistance to discoloration under heating with a lapse of time,

EXAMPLE 3

The procedures of Example 1 were repeated in the same manner except that the polymerization liquid and the imidizing substance were supplied into the third reaction zone without using the in-line mixer, the aging reaction zone was omitted, and the reaction liquid coming from the reaction zone was flashed under atmospheric pressure. All of the conditions remained substantially the same.

EXAMPLE 4

The procedures of Example 3 were repeated in the same manner except that an aging reaction zone having an inner volume of 3 1 and maintained at 230° C. was provided.

EXAMPLE 5

The procedures of Example 3 were repeated in the same manner except that the reaction liquid coming from the reaction zone was flashed into a tank maintained under a reduced pressure of 100 Torr, from a nozzle orifice.

EXAMPLE 6

The procedures of Example 3 were repeated in the same manner except that the polymerization liquid and the imidizing substance were thoroughly mixed by using an in-line mixer, and the mixture was supplied into the third reaction zone.

EXAMPLE 7

The procedures of Example 3 were repeated in the same manner except that the starting feed liquid and the methylamine solution were filtered through a fluoropore filter having a pore size of 0.1 μm.

Comparative Example 2

The procedures of Example 1 were repeated in the same manner by using the same apparatus, but 0.5% of tert-dodecylmercaptan was used as the polymerization degree-modifier, the barrel of the extruder was made of a nitride steel, and the screw was not chromium-plated.

The physical properties of the obtained polymer were as shown below.
Total luminous transmittance: 92%
Heat distortion temperature: 145° C.
Degree of imidization: 80%
YI: 3.2
ΔYI: 9.0
Iron content in polymer: 23.0 ppm As apparent from the above data, the resistance of the polymer to yellowing under heating with a lapse of the time was very poor, although the polymer had an excellent transparency and heat resistance.

The results of the analysis and evaluation of the polymers obtained in Examples 1 through 7 and Comparative Examples 1 and 2 are shown in Table 1.

Preparation of Other Thermoplastic Polymers

ABS

Acrylonitrile and styrene were emulsion-graft-polymerized in the presence of a polybutadiene latex to prepare a graft copolymer having a rubber content of 60%.

MBS

Methyl methacrylate and styrene were emulsion-graft-polymerized in the presence of a polybutadiene latex to prepare a graft copolymer having a rubber content of 50%.

PMMA

Methyl methacrylate was radical-polymerized by the suspension polymerization process using benzoyl de as the initiator.

PET

Polyethylene terephthalate was prepared by a condensation reaction between terephthalic acid and ethylene glycol.

PBT

Polybutylene terephthalate was prepared by a condensation reaction between terephthalic acid and 1,4-butanediol.

Unmodified polyolefin (PP)

An ethylene/propylene copolymer comprising 70% of ethylene and 30% of propylene was prepared.

Modified polyolefin (modified PP)

The above-mentioned (ethylene/propylene copolymer (100 parts) was kneaded in an extruder with 0.03 part of α,α'-bis-t-butyloxy-p-diisopropylbenzene dissolved in a small amount of acetone and 1 part of maleic anhydride, to prepare a modified polyolefin.

Polyamide

Nylon 6, nylon 66 and nylon 12 were prepared by the melt polymerization process. Nylon 6 was obtained from ε-caprolactam, nylon 66 was obtained from hexamethylenediamine and adipic acid, and nylon 12 was obtained from aminododecanoic acid.

Polyphenylene oxide (PPO)

Nonyl 731J (supplied by GE) was used.

Polycarbonate (PC)

Lexan 141 (supplied by GE) was used.

TABLE 1

| | Total luminous transmittance (%) | HDT (°C.) | Degree of imidization (mole %) | Imidization degree distribution (%) | YI | ΔYI | Polymer amide (%) | Monomer amide (ppm) | Residual monomer (ppm) | Number of fine particles per g of polymer | Iron content (ppm) | Molecular weight Mw | Attenuation (dB/km) |
|---|---|---|---|---|---|---|---|---|---|---|---|---|---|
| Example 1 | 93 | 145 | 80 | 1.5 | 0.5 | 0.9 | 1.0 | 250 | 120 | 90,000 | 0.8 | — | — |
| Example 2 | 93 | 145 | 80 | 1.8 | 1.5 | 1.3 | — | — | — | — | 1.0 | — | — |
| Comparative Example 1 | 92 | 145 | 80 | 1.7 | 3.2 | 9.0 | — | — | — | — | 23 | — | — |
| Comparative Example 2 | 86 | 145 | 80 | 7.5 | 3.2 | 9.0 | — | — | — | — | 23 | — | — |
| Example 3 | 85 | 145 | 80 | 8 | 3.7 | 3.0 | 7 | 1600 | 700 | 100,000 | 1 | 85,000 | 5,500 |
| Example 4 | 87 | 145 | 80 | 7 | 2.4 | 1.6 | 1.1 | 1800 | 700 | — | 1 | 85,000 | — |
| Example 5 | 87 | 145 | 80 | 7 | 3.0 | 2.6 | 6 | 250 | 100 | — | 1 | 85,000 | — |
| Example 6 | 87 | 145 | 80 | 3 | 3.6 | 3.0 | 7 | 1600 | 700 | — | 1 | 85,000 | — |
| Example 7 | 85 | 145 | 80 | 8 | 3.6 | 2.8 | 7 | 1600 | 700 | 13,000 | 1 | 85,000 | 4,500 |

EXAMPLES 8 THROUGH 19

The methacrylimide-containing polymer prepared in Example 1 was melt-kneaded with a thermoplastic polymer at a mixing ratio shown in Table 2 by using an extruder having a diameter of 30 mm (chromium-plated screw and barrel made of stainless steel), and the kneaded mixture was pelletized. The extrusion temperature was changed within the range of from 260° to 290° C., and the obtained pellet was vacuum-dried and injection-molded into a test piece, for measuring the physical properties thereof. The cylinder temperature was changed in the range of from 260° to 300° C., and the molding temperature was 90° C. The measurement results are shown in Table 2.

TABLE 2

| Example No. | Mixing ratio (%) Methacrylimide-containing polymer of Example 1 | Other thermoplastic polymer | | HDT (°C.) | YI | ΔYI | Surface gloss (%) |
|---|---|---|---|---|---|---|---|
| 8  | 80 | ABS         | 20 | 135 | 1.1 | 3.2  | 95 |
| 9  | 80 | MBS         | 20 | 137 | 1.1 | 2.8  | 97 |
| 10 | 80 | PMMA        | 20 | 139 | 0.7 | 1.3  | 98 |
| 11 | 80 | PET         | 20 | 130 | 1.2 | 1.7  | 87 |
| 12 | 80 | PBT         | 20 | 129 | 1.2 | 1.9  | 85 |
| 13 | 80 | modified PP | 20 | 132 | 1.5 | 4.5  | 89 |
| 14 | 80 | unmodified PP | 20 | 129 | 2.0 | 7.2 | 83 |
| 15 | 80 | nylon 6     | 20 | 132 | 2.0 | 9.5  | 95 |
| 16 | 80 | nylon 66    | 20 | 135 | 2.1 | 10.7 | 95 |
| 17 | 80 | nylon 12    | 20 | 129 | 2.0 | 8.5  | 95 |
| 18 | 80 | PPO         | 20 | 141 | 2.7 | 3.7  | 87 |
| 19 | 80 | PC          | 20 | 142 | 1.3 | 1.5  | 90 |

Comparative Examples 3 through 14

The methacrylimide-containing polymer prepared in Comparative Example 1 was mixed with another thermoplastic polymer at a mixing ratio shown in Table 3, and the composition was molded in the same manner as described in Examples 8 through 19.

The results of the measurement of the physical properties thereof are shown in Table 3.

The resistance to discoloration under heating, the resistance to the change of the color, and the surface gloss of the molded articles were inferior to those of the molded articles obtained in Examples 8 through 19.

TABLE 3

| Comparative Example No. | Mixing ratio (%) Methacrylimide-containing polymer of Comparative Example 1 | Other thermoplastic polymer | | HDT (°C.) | YI | ΔYI | Surface gloss (%) |
|---|---|---|---|---|---|---|---|
| 3  | 80 | ABS         | 20 | 135 | 4.2 | 11.2 | 89 |
| 4  | 80 | MBS         | 20 | 136 | 4.3 | 10.8 | 90 |
| 5  | 80 | PMMA        | 20 | 138 | 3.7 | 9.3  | 92 |
| 6  | 80 | PET         | 20 | 130 | 4.2 | 9.7  | 81 |
| 7  | 80 | PBT         | 20 | 129 | 4.2 | 9.9  | 78 |
| 8  | 80 | modified PP | 20 | 132 | 4.5 | 12.5 | 77 |
| 9  | 80 | unmodified PP | 20 | 129 | 5.0 | 15.2 | 77 |
| 10 | 80 | nylon 6     | 20 | 133 | 5.0 | 17.5 | 88 |
| 11 | 80 | nylon 66    | 20 | 136 | 5.1 | 18.8 | 87 |
| 12 | 80 | nylon 12    | 20 | 130 | 5.0 | 16.7 | 87 |
| 13 | 80 | PPO         | 20 | 140 | 5.7 | 11.7 | 80 |
| 14 | 80 | PC          | 20 | 141 | 4.3 | 9.7  | 83 |

We claim:

1. A methacrylimide-containing polymer, which is a thermoplastic polymer comprising 2 to 100% by weight of structural units represented by the following general formula (I):

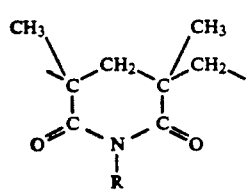

wherein R represents a hydrogen atom or an aliphatic, aromatic or alicyclic hydrocarbon group having 1 to 20 carbon atoms, and 0 to 98% by weight of structural units derived from an ethylenically unsaturated monomer wherein the content of iron in the polymer is not larger than 20 ppm.

2. A methacrylimide-containing polymer as set forth in claim 1, wherein the yellowness index (YI) value as measured by a color difference meter is not larger than 3.

3. A methacrylimide-containing polymer as set forth in claim 1, wherein the difference between the maximum value and minimum value of the degree of imidization in % of twenty samples optionally collected from a shaped article of the polymer, determined by the nitrogen analysis, is not larger than 5%.

4. A methacrylamide-containing polymer as set forth in claim 1, wherein the number of fine particle having a size of 0.5 to 25 μm as measured by a particulate counter in the polymer is not larger than 50,000 per gram of the polymer.

5. A methacrylimide-containing polymer as set forth in claim 1, wherein the molecular weight (Mw) as measured by gel permeation chromatography (GPC) is 50,000 to 200,000.

6. A methacrylimide-containing polymer as set forth in claim 1, wherein the amount of amide segments in the polymer is not larger than 5% by weight.

7. A methacrylimide-containing polymer as set forth in claim 1, wherein the amount of the amide derivative as the volatile component in the polymer is not larger than 1,000 ppm and the amount of the residual monomer as the volatile component in the polymer is not larger than 500 ppm.

8. A methacrylimide-containing polymer as set forth in claim 1, which is obtained by an apparatus for the continuous production of a methacrylimide-containing polymer, which has a continuous imidization reaction apparatus.

9. A methacrylimide-containing polymer as set forth in claim 8, which is continuously prepared in the form of a strand.

10. A resin composition comprising 1 to 99% by weight of a methacrylimide-containing polymer as set forth in claim 3 and 99 to 1% by weight of other thermoplastic polymer.

11. A resin composition as set forth in claim 10, wherein the other thermoplastic polymer is selected from the group consisting of a copolymer (ABS resin) composed of acrylonitrile, butadiene and styrene, a copolymer (MBS resin) composed of methyl methacrylate, butadiene and styrene, a methacrylic resin polymer composed mainly of methyl methacrylate, a thermoplastic polyester, a modified polyolefin, an unmodified polyolefin, a polyamide resin, a polyphenylene oxide and a polycarbonate.

* * * * *